(12) United States Patent
Krzystofczyk et al.

(10) Patent No.: US 8,656,062 B2
(45) Date of Patent: Feb. 18, 2014

(54) SYSTEM AND METHOD FOR WIRELESS PAIRING VIA WIRED CONNECTION

(75) Inventors: Carl J. Krzystofczyk, Mount Prospect, IL (US); Richard R. Zarchy, Crystal Lake, IL (US); Ronald A. Lattanzi, Hawthorn Woods, IL (US); Matthew G. Logsdon, Cary, IL (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 12/858,725

(22) Filed: Aug. 18, 2010

(65) Prior Publication Data
US 2012/0047289 A1 Feb. 23, 2012

(51) Int. Cl.
G06F 3/00 (2006.01)
G06F 9/44 (2006.01)

(52) U.S. Cl.
CPC .................................. *G06F 9/4411* (2013.01)
USPC .......................................................... 710/10

(58) Field of Classification Search
None
See application file for complete search history.

(56) References Cited

U.S. PATENT DOCUMENTS

| | | | |
|---|---|---|---|
| 7,363,129 B1 * | 4/2008 | Barnicle et al. | 701/29 |
| 7,634,337 B2 | 12/2009 | Brozovich et al. | |
| 2005/0152294 A1 | 7/2005 | Yu et al. | |
| 2006/0025897 A1 | 2/2006 | Shostak et al. | |
| 2006/0199537 A1 | 9/2006 | Eisenbach | |
| 2007/0156311 A1 | 7/2007 | Elcock et al. | |
| 2007/0294556 A1 | 12/2007 | Wutka | |
| 2008/0003997 A1 | 1/2008 | Parkkinen et al. | |
| 2008/0015748 A1 * | 1/2008 | Nagy | 701/33 |
| 2008/0033609 A1 | 2/2008 | Razavi | |
| 2008/0070501 A1 | 3/2008 | Wyld | |
| 2008/0076389 A1 | 3/2008 | Lee et al. | |
| 2008/0082221 A1 * | 4/2008 | Nagy | 701/2 |
| 2008/0125067 A1 | 5/2008 | Bells et al. | |
| 2008/0248748 A1 | 10/2008 | Sangster et al. | |
| 2009/0265057 A1 | 10/2009 | Chinnadurai et al. | |
| 2009/0276115 A1 | 11/2009 | Chen | |
| 2009/0299539 A1 | 12/2009 | Chinnadurai et al. | |
| 2010/0100646 A1 * | 4/2010 | Park | 710/8 |
| 2010/0128632 A1 | 5/2010 | Mantysalo | |
| 2011/0153798 A1 * | 6/2011 | Groenendaal et al. | 709/223 |

OTHER PUBLICATIONS

Bluetooth SIG Inc., Bluetooth Specification Version 4.0, vol. 2, "Core System Package [BR/EDR Controller volume]," Part C "Link Manager Protocol Specification," Section 4.2 "Security", pp. 247-275, Jun. 30, 2010.
Ruther et al., U.S. Appl. No. 12/859,051, filed Aug. 18, 2010.

(Continued)

*Primary Examiner* — Henry Tsai
*Assistant Examiner* — Aurangzeb Hassan
(74) *Attorney, Agent, or Firm* — McDonnell Boehnen Hulbert & Berghoff LLP

(57) ABSTRACT

Methods, devices, and computer-readable media related to establishing wireless connections using a wired connection are disclosed. A remote device is communicatively coupled via a wired connection. The remote device receives, via the wired connection, an initialization request to initialize a wireless connection to the remote device. A search of remote device data stored in the remote device is performed. The remote device data can store authentication data related to one or more wireless connections. At the remote device, an initialization response to the initialization request is determined based on the search. The remote device sends the initialization response via the wired connection. The initialization response can indicate whether the initialization response is accepted or rejected. If the initialization response is accepted, the wireless connection to the remote device can be subsequently established and the wired connection can be subsequently closed.

20 Claims, 7 Drawing Sheets

(56) References Cited

OTHER PUBLICATIONS

Panko, U.S. Appl. No. 61/374,805, filed Aug. 18, 2010.
Ruther, U.S. Appl. No. 61/374,707, filed Aug. 18, 2010.
Ruther et al., U.S. Appl. No. 61/374,723, filed Aug. 18, 2010.
Vital Engineering, "Support and Frequently Asked Questions", 2006, Vital Engineering, available at http://www.vitalengineering.co.uk/support.htm (last visited Jan. 4, 2007).

* cited by examiner

US 8,656,062 B2

SYSTEM AND METHOD FOR WIRELESS PAIRING VIA WIRED CONNECTION

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston ring compressors, and vehicle brake tools. The tools used by vehicle technicians may also include electronic tools such as a digital voltage-ohm meter (DVOM) or a vehicle scan tool that communicates with an electronic control unit (ECU) within a vehicle.

Vehicle technicians may work at various locations of a vehicle in order to diagnose and/or repair the vehicle. For example, while working on an automobile having a passenger compartment and an under-hood area containing an internal combustion engine, a vehicle technician may desire to work at the under-hood area and at the passenger compartment. For example, the vehicle technician may desire to use a DVOM to make a voltage measurement at the under-hood area while the technician operates user controls within the passenger compartment so as to re-create a vehicle performance complaint (e.g., a cylinder misfire).

The vehicle scan tool and/or DVOM can be linked via a wireless connection to a controller or display device. The wireless connection can be established using one or more wireless communication protocols, such as the Bluetooth protocol, IEEE 802.11 ("WiFi"), or IEEE 802.16 ("WiMax").

An initialization procedure for wireless connections can be required prior to establishment of the wireless connection, in accordance with a given wireless communication protocol. One such initialization process is the Bluetooth protocol's "pairing" process for authenticating wireless communications. During the pairing process, two Bluetooth devices exchange identification information over the air to generate and store a "common link key." The two Bluetooth devices can then retrieve and use the stored common link key to communicate over the wireless connection with an authenticated, specific device in the future.

OVERVIEW

Various example embodiments are described in this description. In one respect, an example embodiment may take the form of a method. A remote device is communicatively coupled via a wired connection. The remote device receives, via the wired connection, an initialization request to initialize a wireless connection. A search of remote device data stored in the remote device is performed. At the remote device, an initialization response to the initialization request is determined based on the search. The remote device sends the initialization response via the wired connection.

In a second respect, an example embodiment may take the form of a device that includes a wired-communication interface, a memory, a processor, and instructions. The instructions are stored in the memory. Upon execution by the processor, the instructions cause the device to perform a set of functions. The set of functions include: (a) communicatively coupling to a wired connection via the wired-connection interface, (b) receiving an initialization request to initialize a wireless connection via the wired connection, (c) performing a search of remote device data stored in the memory, (d) determining an initialization response to the initialization request based on the search, and (e) sending the initialization response.

In a third respect, an example embodiment may take the form of a computer-readable storage medium having instruction stored thereon. The instructions, upon execution by a processor of a device, cause the device to perform a set of functions. The set of functions include: (a) communicatively coupling to a wired connection, (b) receiving an initialization request to initialize a wireless connection via the wired connection, (c) performing a search of stored remote device data, (d) determining an initialization response to the initialization request based on the search, and (e) sending the initialization response via the wired connection.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, wherein like numerals denote like entities, in which.

DETAILED DESCRIPTION

I. Introduction

Figure 1:
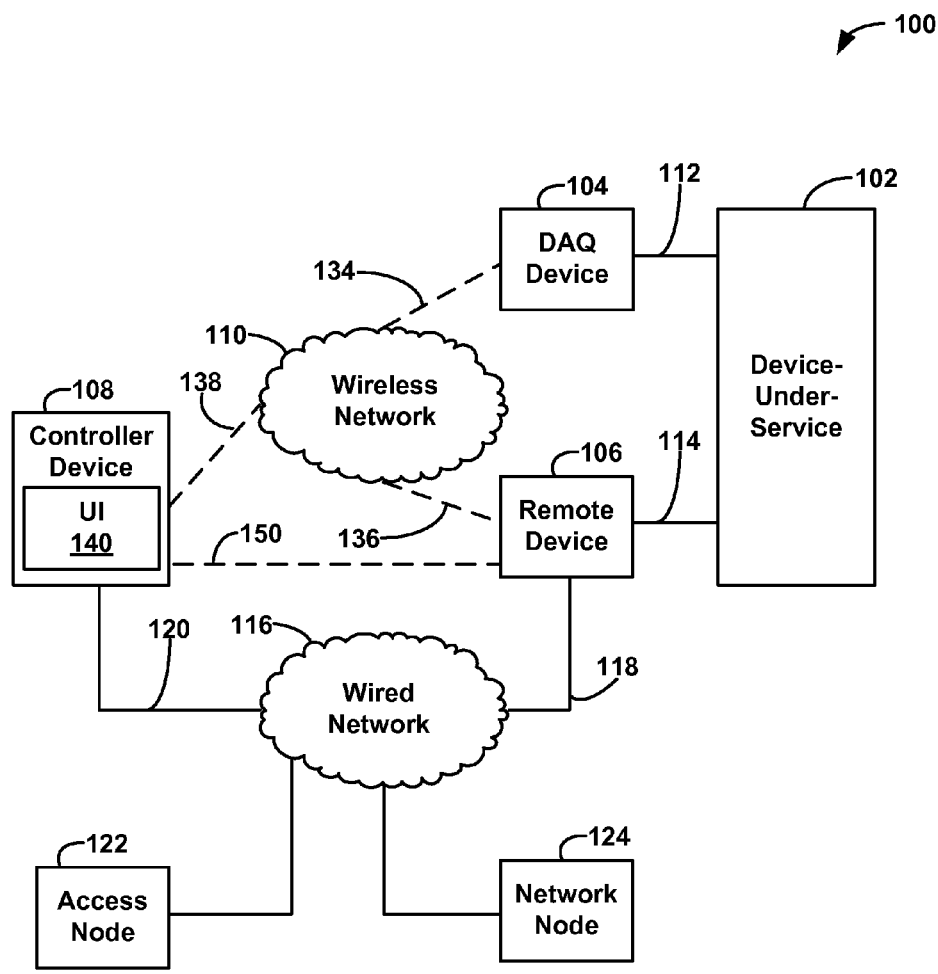
FIG. 1 is a block diagram of a system in accordance with an example embodiment.

This description sets forth systems comprising multiple devices. Each device of a described system is operable independently (e.g., as a stand-alone device) as well as in combination with other devices of the system. Each device of a described system can be referred to as an apparatus.

Each device of a described system is operable to carry out functions for servicing a device-under-service. The device-under-service may comprise a vehicle, a refrigeration unit, a personal computer, or some other serviceable device. Additionally or alternatively, the device-under-service may comprise a system such as a heating, ventilation, and air conditioning (HVAC) system, a security system, a computer system (e.g., a network), or some other serviceable system. The functions for servicing the device-under-service may include but are not limited to diagnostic functions, measurement functions, and scanning functions.

To work in combination with each other, the device of a described system is operable to communicate with another device via a communications network. The communications network may comprise a wireless network, a wired network, or both a wireless network and a wired network. Data obtained by a device from a device-under-service or data otherwise contained in that device may be transmitted to another device via the communications network between those devices.

In particular, a remote device can establish wireless connections with one or more other devices of the described system, such as a controller device. The remote device can establish these wireless connections using authentication data, such as Bluetooth link identifiers, determined via communication over a communicative coupling, such as a wired connection. The use of a wired connection to transfer authentication data can increase connection security, decrease initialization error, and reduce user interface complexity for the remote device.

The use of wired connections to establish wireless connections can provide several advantages related to control and ease of use. In a scenario where several Bluetooth devices are in proximity to each other, such as wireless automotive diagnostic devices in a shop environment, Bluetooth discovery can lead to pairing of wireless devices that were not intended to be paired. For example, if two wireless automotive diagnostic devices are in proximity to each other, a common display device may pair with an unintended wireless automotive diagnostic device. Further, in some scenarios, it is desirable that the pairing process take place without specific user action on the wireless device (e.g., pressing a button on a wireless device to begin a pairing process), as the user action can be confusing or inaccurate. Taking the automotive example further, an automotive diagnostic device with a "pairing" button could inaccurately begin pairing if a vehicle technician or other user bumps the pairing button during an automotive repair. To solve these and other problems, two Bluetooth devices are paired via a wired communicative coupling, such as a Universal Serial Bus (USB) link. Use of wired communicative couplings can solve the problem of incorrect pairing while eliminating the need for user intervention. Once paired, the wired connection is no longer required to be used by the paired devices to effect wireless communications.

While wired communicative couplings are in place, the wireless automotive diagnostic device can support sending information simultaneously over the wired and wireless connections. Some embodiments of the wireless automotive diagnostic device do not need to have a battery; rather, these embodiments draw power from an external power source (e.g., vehicle battery, commercial power, etc.) In these embodiments, the wireless automotive diagnostic device can draw power from the wired connection.

A tool salesman may sell one or more of the devices of a described system to a vehicle technician that works on devices-under-service. By selling devices that are operable as stand-alone devices as well as within a system of multiple devices, the tool salesman can sell the devices to a technician one at a time until the technician acquires one of each device operable within the system of multiple devices. This allows the vehicle technician to use the purchased device(s) on a device-under-service and to spread the cost of purchasing multiple devices over time without having to purchase the multiple devices all at once. Furthermore, the tool salesman may sell software applications (e.g., computer-readable program instructions) for execution on a device (e.g., a personal digital assistant) that the tool salesman does not sell, but that is operable with the a device of the descried systems to service a device-under-service.

II. Example Architecture

FIG. 1 is a block diagram of a system 100 in accordance with an example embodiment. System 100 comprises devices 104, 106, and 108. For purposes of this description, device 108 is referred to as a controller device, device 104 is referred to as a data-acquisition (DAQ) device, and device 106 is referred to as a scanner device or a remote device. FIG. 1 shows wireless links using dashed lines and wired links using solid lines.

Devices shown in the Figures and described in this specification are also described in U.S. patent application Ser. No. 12/859,051, entitled "System and Method for Universal Scanner Module to Buffer and Bulk Send Vehicle Data Responsive to Network Conditions", filed Aug. 18, 2010; U.S. Patent Application No. 61/374,805, entitled "Cable Assembly for Protection Against Undesired Signals,"; filed Aug. 18, 2010; U.S. Patent Application No. 61/374,707, entitled "System and Method for Integrating Devices for Servicing a Device-Under-Service", filed Aug. 18, 2010; and U.S. Pat. App. No. 61/374,723, entitled "Method and Apparatus to Use Remote and Local Control Modes to Acquire and Visually Present Data,", filed Aug. 18, 2010, all of which are fully incorporated by reference herein for all purposes.

The block diagram of FIG. 1 and other block diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements can be carried out by a processor executing computer-readable program instructions and/or by any combination of hardware, firmware, and software.

A wireless network 110 may be established between any two or more of devices 104, 106, and 108. Any one of those devices may join (e.g., begin communicating via) wireless network 110 after wireless network 110 is established. As an example, FIG. 1 shows wireless network 110 connected to: DAQ device 104 via wireless link 134, remote device 106 connected via wireless link 136, and controller device 108 via wireless link 138. In some embodiments, a wireless link includes a point-to-point wireless connection between two devices, such as wireless link 150 between remote device 106 and controller device 108. Devices 104, 106, and 108 are operable to carry out communications with each other via wireless network 110. Other devices, such as a personal digital assistant (PDA) may be operable to join wireless network 110 as another remote device so as to communicate with other devices communicating via wireless network 110.

Wireless network 110 may comprise one or more wireless networks. Each of the one or more wireless networks may be arranged to carry out communications according to a respective air interface protocol. Each air interface protocol may be arranged according to an industry standard, such as an Institute of Electrical and Electronics Engineers (IEEE) 802 standard. The IEEE 802 standard may comprise an IEEE 802.11 standard for Wireless Local Area Networks (e.g., IEEE 802.11a, b, g, or n), an IEEE 802.15 standard for Wireless Personal Area Networks, an IEEE 802.15.1 standard for Wireless Personal Area Networks—Task Group 1, an IEEE 802.16 standard for Broadband Wireless Metropolitan Area Networks, or some other IEEE 802 standard. For purposes of this description, a wireless network arranged to carry out communications according to the IEEE 802.11 standard is referred to as a Wi-Fi network, and a wireless network arranged to carry out communications according to the IEEE 802.15.1 is referred to as a Bluetooth network.

DAQ device 104 may connect to a device-under-service 102 via wired link 112. Wired link 112 may comprise input leads. DAQ device 104 may comprise a digital volt meter (DVM), a digital volt ohm meter (DVOM), or some other type of measurement device.

Remote device 106 may connect to device-under-service 102 via wired link 114. Wired link 114 may be arranged as a cable assembly. Other example arrangements of wired link 114 are also possible. Remote device 106 may comprise a device that is operable to request and/or monitor data from an electronic control unit (ECU) of device-under-service 102.

Device-under-service 102 may comprise a vehicle, such as an automobile, a motorcycle, a semi-tractor, farm machinery, or some other vehicle. System 100 is operable to carry out a variety of functions, including functions for servicing device-under-service 102. The example embodiments may include or be utilized with any appropriate voltage or current source, such as a battery, an alternator, a fuel cell, and the like, providing any appropriate current and/or voltage, such as about 12 volts, about 42 volts, and the like. The example embodiments may be used with any desired system or engine. Those systems or engines may comprise items utilizing fossil fuels, such as gasoline, natural gas, propane, and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

One or more of remote devices 104 and 106 and controller device 108 may connect to a wired network 116. Remote device 106 and controller device 108 may connect to wired network 116 via wired links 118 and 120, respectively. In some embodiments, devices are connected via point-to-point wired links not shown in FIG. 1 without connecting to wired network 116; for example, remote device 106 and controller device 108 can be directly connected via a point-to-point wired link.

Wired network 116 may include and/or connect to the Internet, and wired network 116 may include and/or connect to one or more network nodes, such as an access node 122 and a network node 124. Access node 122 may provide one or more of devices 104, 106, and 108 with wireless connectivity to wired network 116. Network node 124 may comprise a desktop personal computer (PC), a workstation that executes an operating system written by the Microsoft Corporation of Redmond, Wash. (e.g., a Microsoft Windows® operating system), a Unix-based or Linux-based operating system, or some other node that interfaces and/or connects to wired network 116. In accordance with an example in which device-under-service 102 comprises an automobile, network node 124 may comprise a desktop PC or workstation operating at an automobile repair facility. In that regard, network node 124 may operate as a server that provides data (e.g., automobile repair data and/or instruction data) to controller device 108.

DAQ device 104 and remote device 106 may each transmit data to controller device 108 for display via user interface (UI) 140. For example, DAQ device 104 may transmit data to controller device 108 via the Bluetooth network of wireless network 110 and remote device 106 may transmit data to controller device 108 via the Wi-Fi network of wireless network 110. Alternatively, DAQ device 104 and remote device 106 may take turns transmitting data to controller device 108 via the Bluetooth network, the Wi-Fi network, or both the Bluetooth network and the Wi-Fi network.

User interface 140 is operable to present data to a user and to enter user selections. User interface 140 may include one or more data presentation elements, such as a display. An example display may include, but is not limited to, one or more liquid crystal displays (LCDs), one or more plasma displays, one or more touch-screens, and some other types of displays. The display is operable to visually present data, such as data transmitted to wireless transceiver 202 from a remote device (e.g., DAQ device 104 or remote device 106), data that is sent and/or received via wireless link 138 and/or wired link 120, data stored within controller device 108, or some other type of data. As such, user interface 140 may simultaneously display data that is transmitted to controller device 108 from DAQ device 104 and data that is transmitted to controller device 108 from remote device 106. User interface 140 may also include other data presentation elements Example data presentation elements include, but are not limited to, the aforementioned display, LEDs, loudspeakers, lights, and touch screens.

User interface 140 may include one or more selection elements operable to enter user selections. Example selection elements include, but are not limited to, keyboards, microphones, touch-screens, switches, buttons, computer mice, joysticks, and other types of selection elements.

Figure 2:
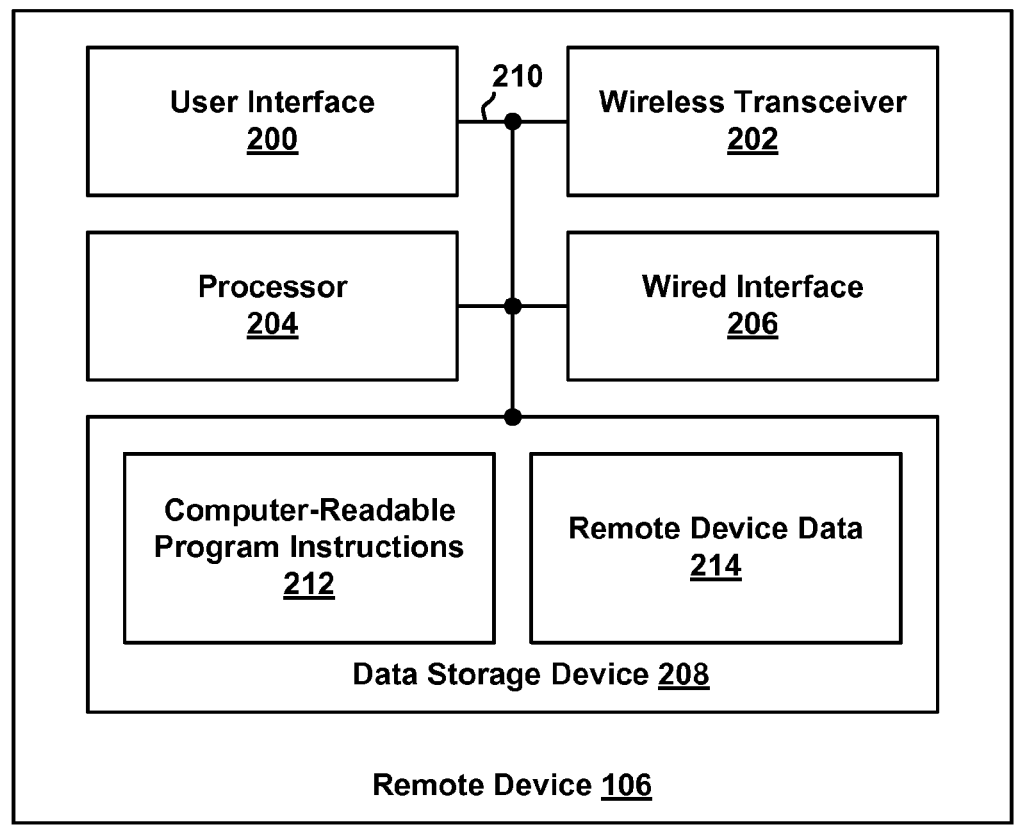
FIG. 2 is a block diagram of an example remote device.
Figure 3:
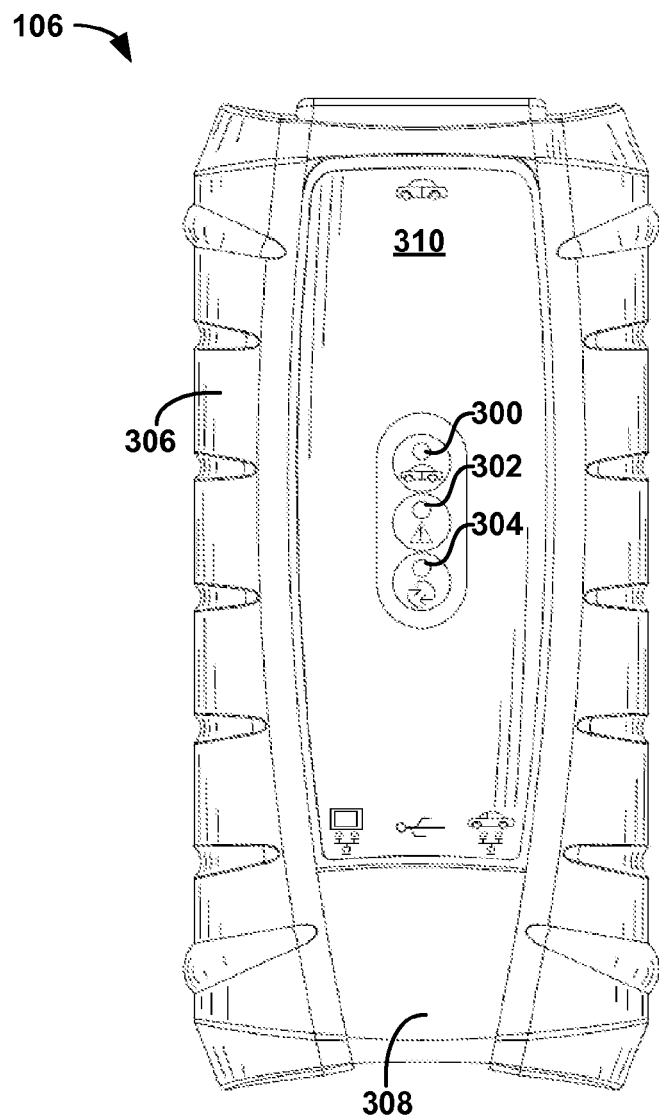
FIGS. 3, 4, 5 and 6 illustrate various views and details of an example embodiment of the remote device of FIG. 2.

FIG. 2 is a block diagram of an example remote device 106 and FIG. 3 to FIG. 8 illustrate details of an example embodiment of remote device 106. As illustrated in FIG. 2, remote device 106 includes a user interface 200, a wireless transceiver 202, a processor 204, a wired interface 206, and a data storage device 208, all of which may be linked together via a system bus, network, or other connection mechanism 210. User interface 200 is operable to present data to a user of remote device 106. Elements of user interface 200 are illustrated in FIG. 3.

Wireless transceiver 202 comprises a wireless transceiver that is operable to carry out communications via wireless network 110. Wireless transceiver 202 may comprise a Bluetooth transceiver, a Wi-Fi transceiver, or some other type of wireless transceiver. Wireless transceiver 202 may carry out communications with remote device 106, controller device 108, or some other device that is operating to communicate via wireless network 110.

Wireless transceiver 202 is not limited to a single wireless transceiver. For example, wireless transceiver 202 may comprise a Bluetooth transceiver and a Wi-Fi transceiver. In accordance with such an example, the Bluetooth transceiver may establish wireless link 136 to communicate with controller device 108 and/or DAQ device 104 via a Bluetooth network of wireless network 110, and the Wi-Fi transceiver may establish wireless link 136 to enable remote device 106 to communicate with a Wi-Fi network; in particular, the Wi-Fi transceiver can enable remote device to communicate with controller device 108 and/or DAQ device 104 via a Wi-Fi network of wireless network 110.

In accordance with an embodiment in which DAQ device 104, remote device 106 and controller device 108 each include a single wireless transceiver (e.g., a Bluetooth transceiver), one of the devices, such as controller device 108, can operate as a master, and the other devices, such as DAQ device 104 and remote device 106, can operate as slaves to the master.

In accordance with an embodiment in which DAQ device 104 includes a single transceiver (e.g., a Bluetooth transceiver) and remote device 106 and controller device 108 each include two transceivers (e.g., a Bluetooth transceiver and a Wi-Fi transceiver), DAQ device 104 and remote device 106 may simultaneously transmit data over wireless links 134 and 136, respectively, to controller device 108 for display via user interface 140. In that regard, remote device 106 may transmit data to controller device 108 via the Bluetooth network of wireless network 110 and remote device 106 may transmit data to controller device 108 via the Wi-Fi network of wireless network 110.

In accordance with an embodiment in which wireless transceiver 202 includes three or more wireless transceivers, two or more of the wireless transceivers may communicate according to a common air interface protocol or different air interface protocols.

Wired interface 206 may comprise one or more ports. As an example, wired interface 206 may include ports 500, 502, and 504 (illustrated in FIG. 5).

Port 500 may comprise a USB port. The USB port may communicatively connect to a first end of a USB cable. A second end of the USB cable may connect to a USB port of some other device; e.g., device-under-service 102, DAQ device 104, controller device 108, or access node 122. Data to be stored as remote device data 214 and data to be stored as remote device data 214 may be transmitted via the USB cable that connects to port 500.

Ports 502 and 504 may comprise respective Ethernet ports. Each Ethernet port may communicatively connect to a first end of a respective Ethernet cable. A second end of each Ethernet cable may connect to a respective Ethernet port connected to a device connected to wired network 116 or some other device. As an example, port 502 may connect to an Ethernet port of network node 124 via the Ethernet cable.

Wired interface 206 may also include a configurable set of switches. The set of switches may be configurable based on data associated with the device-under-service.

Processor 204 may comprise one or more general purpose processors (e.g., INTEL microprocessors) and/or one or more special purpose processors (e.g., digital signal processors). Processor 204 may execute computer-readable program instructions 212 that are contained in computer-readable data storage device 208.

Data storage device 208 may comprise a computer-readable storage medium readable by processor 204. The computer-readable storage medium may comprise volatile and/or non-volatile storage components, such as optical, magnetic, organic or other memory or disc storage, which can be integrated in whole or in part with processor 204. Data storage device 208 may include computer-readable program instructions (CRPI) 212, remote device data 214, and other data.

Remote device data 214 may include data associated with a device that is arranged to communicate with remote device 106 via wireless network 110. For example, remote device data 214 may include authentication data, such as a radio identifier and password associated with a device, such as controller device 108. Remote device data 214 can include data related to remote device 106 as well, such as device addresses, network addresses, encryption keys, passwords, PINS, random number generation data (e.g., random number seeds), and/or other data related to remote device 106.

CRPI 212 may include instructions configured to read, write, update, and/or search remote device data 214. For example, at least a portion of remote device data 214 may be arranged to store data, such as authentication data, in one or more logical storage locations or "entries." CRPI 212 may be configured to search for an unused entry in remote device data 214 to store authentication data. Such a search may result in finding one or more unused entries for storage of authentication data or, alternatively may result in determining there are no unused entries in remote device data 214. CRPI 212 may be configured to search remote device data 214 to find an entry used to store data related to a specific device (e.g., authentication data for controller device 108).

An entry of remote device data 214 may include storage for authentication data. In some embodiments, the entry includes a replace-ability indicator, indicating whether or not the authentication data in that entry can be replaced by later data. In other embodiments, the entry can include a usage indicator that the entry is used or unused.

As an example, authentication data can include a Bluetooth link key. The Bluetooth link key can be established via a pairing procedure, such as a Bluetooth pairing procedure. One pairing procedure involves an initiator device (e.g., controller device 108) sending a pairing request, which is then either accepted or rejected by a responder device (e.g., remote device 106). If the pairing request is accepted, both the initiator device and responder device calculate a Bluetooth initialization key based on a Bluetooth address of the responder device. Then, a Bluetooth link key is determined as a "unit key" of the initiator or responder device, or a "combined key" based on device addresses and random numbers generated by both the initiator and responder devices. Once established, the Bluetooth link key can be used to authenticate messages communicated between the initiator and responder devices. CRPI 212 can include instructions for carrying out the pairing procedure.

Remote device data 214 can have entries for one or more other devices. In that regard, remote device data 214 may include respective entries associated with each of a plurality of devices operable to communicate via wireless network 110, such as entries associated with each of DAQ device 104 and controller device 108.

Next, FIG. 3 illustrates a front view of an example embodiment of remote device 106. FIG. 3 further illustrates that remote device 106 includes visual indicators 300, 302, and 304, a grip 306, a port access cover 308, and a cover 310. Port access cover 308 may provide protection for one or more ports of wired interface 206. Cover 310 may provide protection for user interface 200, wireless transceiver 202, processor 204, wired interface 206, and data storage device 208.

Visual indicators 300, 302, and 304, which may be part of user interface 200, may include a respective light emitting diode (LED) or some other visual indictor that is operable to convey information to a user. Program instructions 212 may be executable by processor 204 to turn visual indicators 302, 304, and 306 on and off.

Visual indicator 300 may turn off to indicate that remote device 106 is both not communicating with and not receiving electrical power from device-under-service 102. Visual indicator 300 may turn on to indicate that remote device 106 is receiving electrical power from device-under-service 102 but is not communicating with device-under-service 102. Visual indicator 300 may flash (e.g., turn on for 1 second and then turn off for 1 second) to indicate remote device 106 is both communicating with and receiving electrical power from device-under-service 102.

Visual indicator 302 may turn on and off to so as to flash. In particular, visual indicator 302 may flash in specific sequences so as to identify any of a variety of diagnostic codes. The diagnostic codes, for example, could pertain to (i) device-under-service 102, (ii) remote device 106, or (iii) a device that is operable to communicate with remote device 106 via wireless transceiver 202. As an example, visual indicator 302 may flash 3 times, wait, and then flash 2 more times, so as to visually present a diagnostic code of 32. Also, visual indicator 302 may turn off to indicate no error (and hence no diagnostic code) has been found, and may turn on to indicate a failure within remote device 106.

Visual indicator 304 may turn off to indicate remote device 106 is not communicating with controller device 108. Visual indicator 304 may turn on to indicate that remote device 106 is carrying out wired communications with controller device 108 and may flash to indicate that remote device 106 is carrying out wireless communications with controller device 108.

Other examples of presenting data via visual indicators 300, 302, 304 are also possible.

Grip 306 can be arranged to cover portions of port access cover 308 and portions of cover 310. Grip 306 may be removed away from port access cover 308 so as to allow port access cover 308 to be moved to an open position. Grip 306 may be made from rubber. As an example, grip 306 may be arranged as a single piece of rubber. When attached to remote device 106, grip 306 may provide shock protection to remote device 106 in the event that remote device 106 is dropped or struck.

Figure 4:
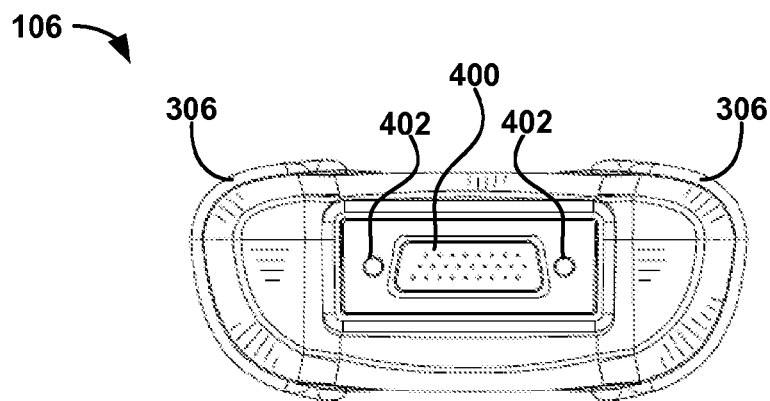

Next, FIG. 4 illustrates a top view of an example embodiment of remote device 106. FIG. 4 further illustrates grip 306 and that remote device 106 includes a port 400 and connector mounting holes 402. As an example, port 400 may include a high-density-26 (HD-26) connector, but is not so limited. An HD-26 connector may include 26 male or female connector terminals. Port 400 is arranged to connect to wired link 114. Wired link 114 may include fasteners that are arranged to fasten wired link 114 to remote device 106 via connector mounting holes 402.

Figure 5:
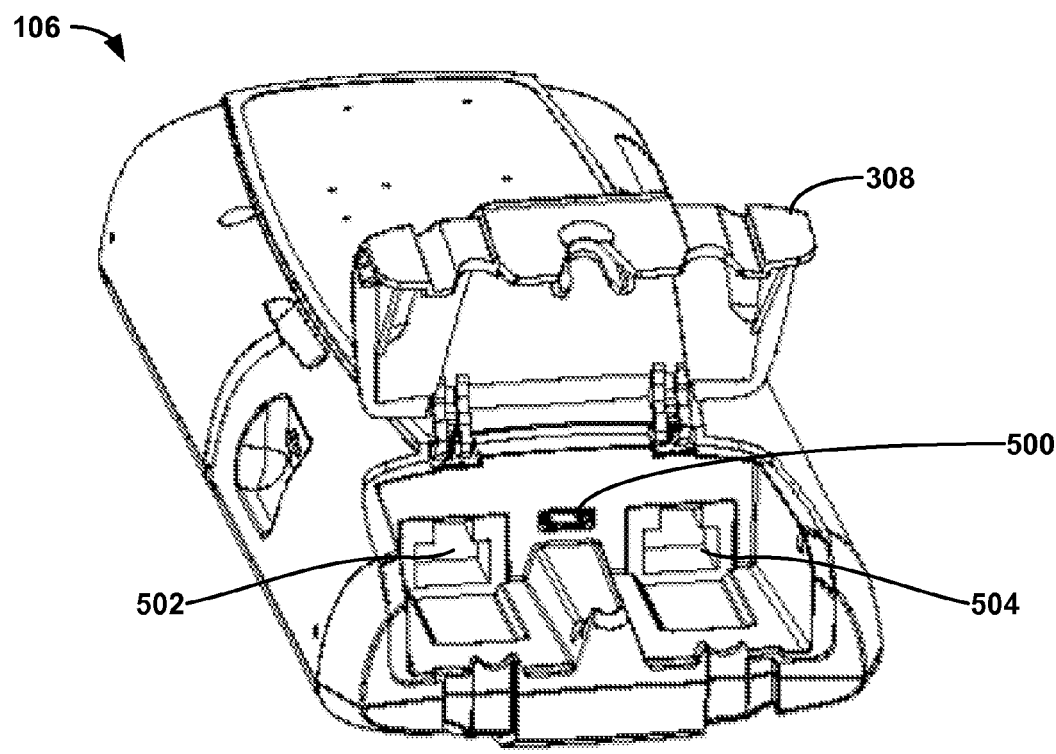

Next, FIG. 5 illustrates an example embodiment of remote device 106, but without grip 306. FIG. 5 further illustrates port access cover 308 in an open position and that remote device 106 includes ports 500, 502, and 504.

Port 500 may be arranged as a USB port or some other type of wired port, and ports 502 and 504 may be arranged as Ethernet ports or some other type of wired ports. In an alternative embodiment, the ports accessible via port access cover 308 may include a quantity of ports less than 3 ports or greater than 3 ports. Remote device 106 may include a respective cable opening for each port accessible via port access cover 308. Alternatively, one or more cable openings may allow multiple cables to pass through port access cover 308 so as to extend away from remote device 106.

Figure 6:
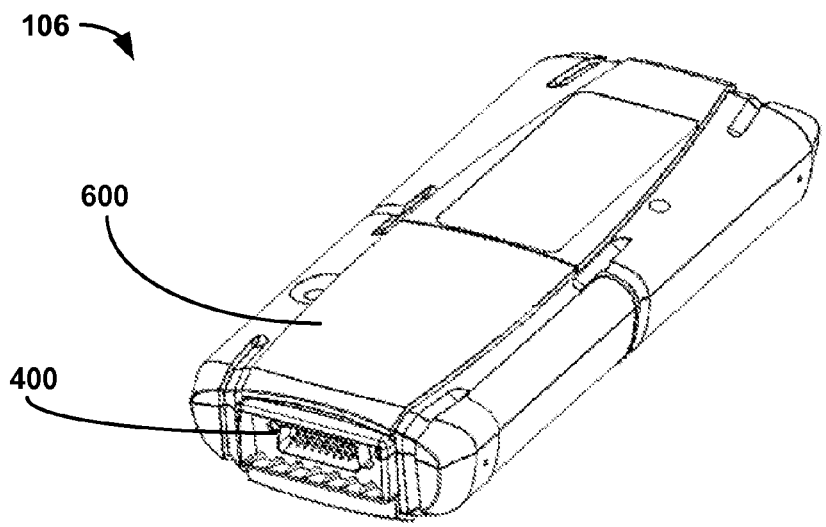

Next, FIG. 6 illustrates an example embodiment of remote device 106, but without grip 306. FIG. 6 further illustrates expansion cover 600 and port 400. Expansion cover 600 is removable from remote device 106 so as to provide access to an expansion port.

III. Example Communications

Figure 7:
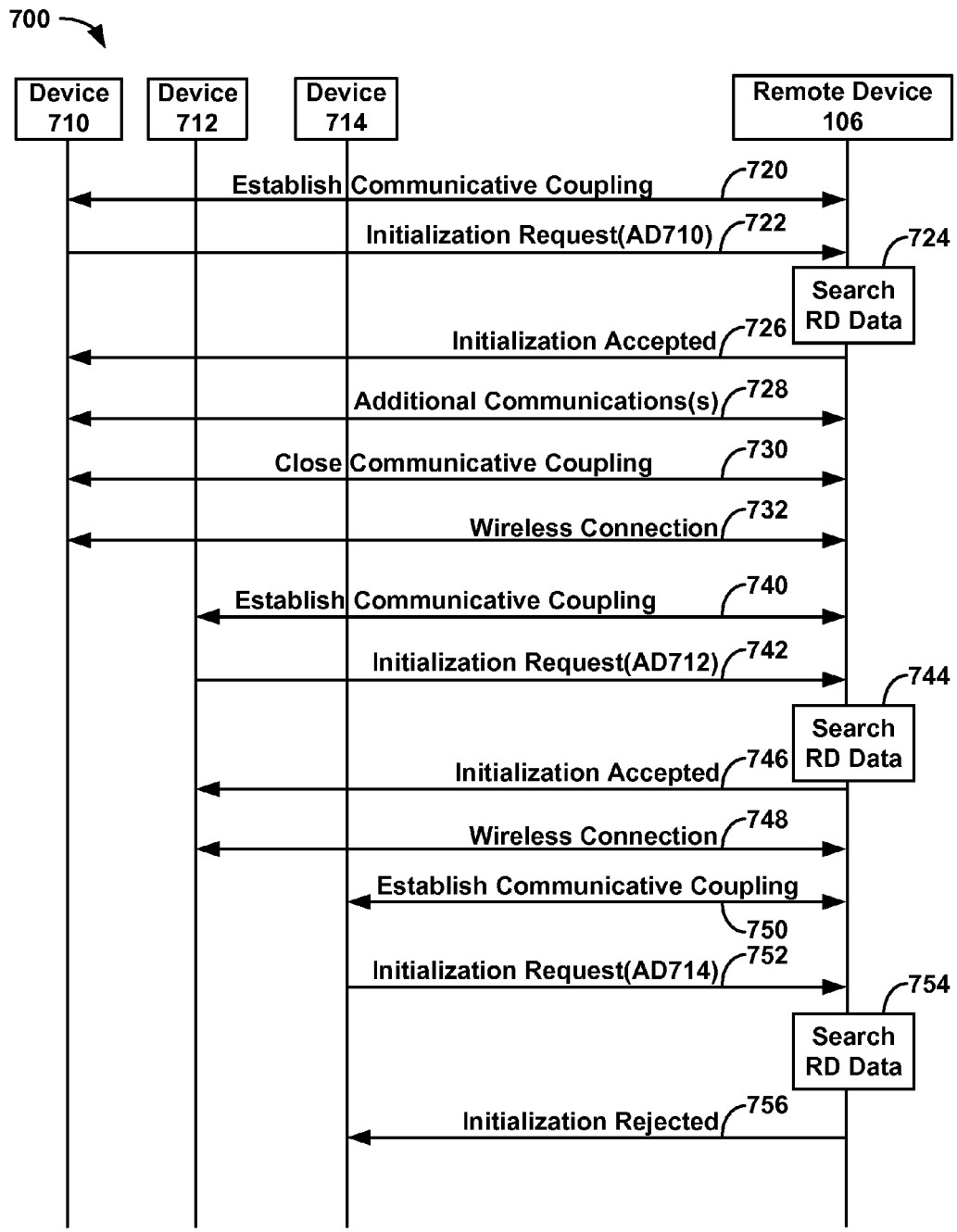
FIGS. 7, 8A, and 8B illustrate example communications sent between the example devices.
Figure 8A:
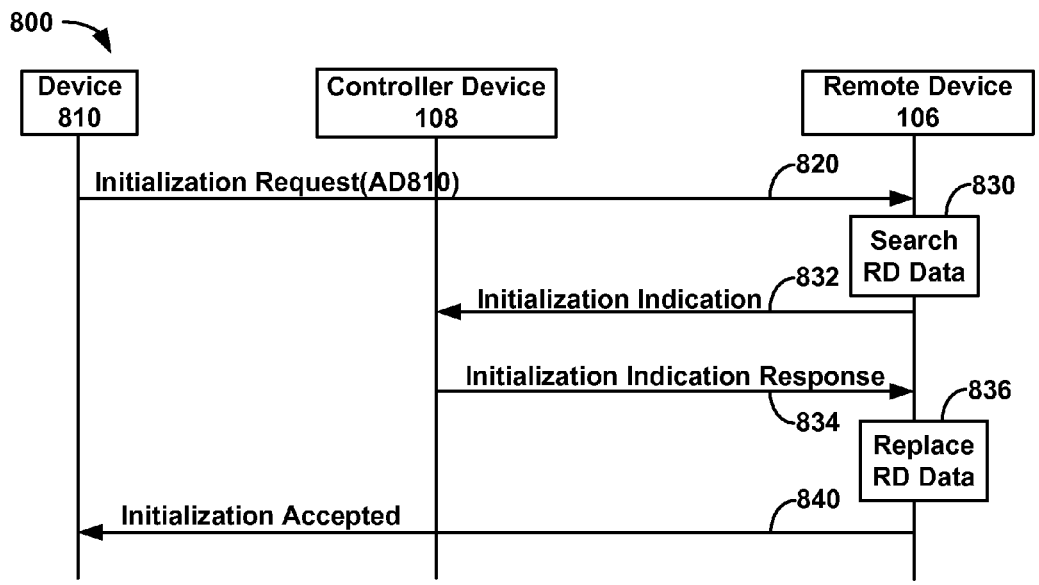
Figure 8B:
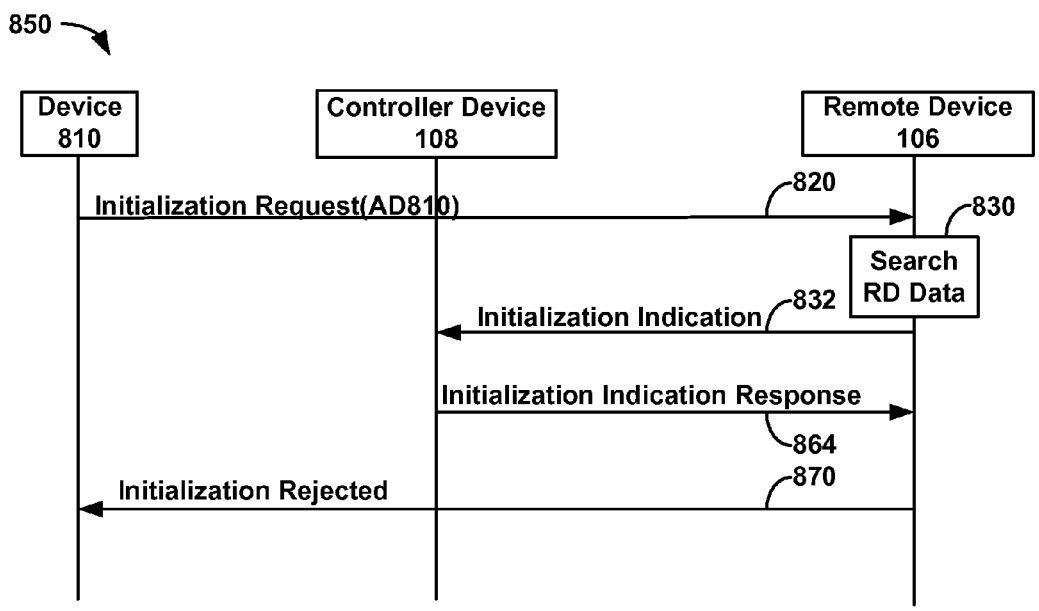

A variety of communications may be carried out via wireless network 110 and wired network 116. Examples of those communications are illustrated in FIGS. 7, 8A, and 8B. The communications shown in FIGS. 7, 8A, and 8B can be in the form of messages, signals, packets, protocol data units (PDUs), frames, fragments and/or any other suitable type of communication configured to be communicated between devices.

FIG. 7 shows an example scenario 700 where remote device 106 processes initialization requests received from devices 710, 712, and 714. In some embodiments, one or more of the requests/responses shown in FIG. 7 include one or more link manager protocol (LMP) PDUs in accordance with the Bluetooth Specification. See Bluetooth SIG, Inc., Bluetooth Specification Version 4.0, Volume 2, "Core System Package [BR/EDR Controller volume]," Part C "Link Manager Protocol Specification," Section 4.2 "Security", pages 247-275, Jun. 30, 2010 ("the Bluetooth Security Section"), the entirety of which is herein incorporated by reference.

The Bluetooth protocol describes a challenge-response scheme to determine if two devices (e.g., remote device 106 and device 710, 712, or 714) are "paired" or share a common link key that authenticates wireless communications. See the Bluetooth Security Section, pages 247-249.

Two un-paired devices can be paired using a Bluetooth pairing procedure. An initiating device (e.g., device 710, 712, or 714) sends a Link Manager Protocol (LMP) random number Protocol Data Unit (PDU) to a responding device (e.g., remote device 106) to initiate the Bluetooth pairing procedure. The Bluetooth Security Section indicates that the responding device can either accept or reject the random number PDU. If the random number PDU is accepted, the responding device either sends an acceptance message or calculates a random number based on the responding device's identification number (PIN) and sends the random number via a random number PDU to the initiating device. If the random number PDU is sent to the initiating device, the initiation device can then accept or reject the random number PDU. If both the initiating device and responding device accept pairing, both devices independently calculate the common link key and perform mutual authentication. The initiating and responding devices are then paired.

Scenario 700 begins with device 710 and remote device 106 establishing communicative coupling 720. The communicative coupling can be a wired communicative coupling established via wired interface 206 of remote device 106. For example, the wired communicative coupling can be established via use of a USB cable attached to both a USB port of device 710 and port 500 of remote device 106. In other scenarios, the wired communicative coupling can be established via an Ethernet cable attached to both an Ethernet port of device 710 and port 502 (or 504) of remote device 106. Other communicative couplings are possible as well. In some embodiments, establishment of the wired communicative coupling can initiate the Bluetooth pairing procedure without additional user intervention (i.e., pairing is part of "plug-and-play" configuration once a wired connection is established with remote device 106).

Once the communicative coupling is established, device 710 can send initialization request 722 to remote device 106 via the communicative coupling. Initialization request 722 can include authentication data (AD), shown in FIG. 7 as "AD710". Authentication data can be a random number, an identifier of device 710, a link key for a link between device 710 and remote device 106, a user identifier, password information, and/or other data.

Upon reception of an initialization request, remote device 106 determines whether the initialization request is to be accepted or rejected based on a search of remote device (RD) data, such as shown in block 724 of FIG. 7. The remote device data, such as remote device data 214, can be arranged using any suitable data structure or organization configured to at least enable a device, such as remote device 106, to perform the herein-described procedures of remote device data. For example, a database, a table, a list, a linked list, an object, and/or one or more other data structures or arrangements of data configured to perform the herein-described procedures of remote device data can be used. In some embodiments, the remote device data can be divided into one or more portions or "remote-device-data entries." Each remote-device-data entry can include any suitable data structure or organization configured to enable a device, such as remote device 106, to perform the herein-described procedures of a remote-device-data entry.

Remote device data can be searched prior to determining that an initialization request is to be accepted, conditionally accepted, or rejected. For example, assume that a search of remote device data 724 indicated that initialization request 722 was to be accepted by remote device 106.

Then, remote device 106 can responsively send initialization accepted 726 message to device 710. After initialization request 722 is accepted, remote device 106 and device 710 can exchange additional communication(s) 728. In some embodiments, additional communication(s) 728 include additional authentication data, such as key information (e.g., Bluetooth unit key or combination key information), challenge/response data, password/identifier information, random numbers, and/or other additional authentication data. In these embodiments, additional communication(s) 728 can also, or instead, include other information, such as connection information (e.g., addressing information), service information, user data, and/or other information. In still other embodiments, additional communication(s) 728 are not sent or received.

As a result of initialization request 722, search remote device data 724, initialization accepted 726, and/or additional communication(s) 728, any authentication data required to establish a wireless connection between remote device 106 and device 710 can be exchanged via the communicative coupling. Once the required authentication data has been exchanged, the communicative coupling can be closed as shown at 730 of FIG. 7. In some embodiments, procedures for close communicative coupling 730 include detaching a cable or link used to form a wired communicative coupling with remote device 106 (e.g., removing a USB cable from port 500 or removing an Ethernet cable from either port 502 or 504).

Some or all of the required authentication data can be stored in a remote-device-data entry of the remote device data. For example, a remote-device-data entry can include device identifiers, address information, one or more shared secrets (e.g., Bluetooth link keys, public key information), and/or other information used by remote device 106 to authenticate device 710. Once authentication data is stored in a remote-device-data entry, the remote-device-data entry can be considered to be "full" or used; otherwise, a remote-device-data entry can be considered to be "empty" or not storing authentication data.

As the required authentication data has been exchanged, device 710 and remote device 106 can use the required authentication data to establish and use wireless connection 732 for communication therebetween. The authentication data related to wireless connection 732 can include, but is not limited to, information received in initialization request 722 (e.g., part or all of AD710), data received in other communications from device 710, data generated by remote device, and/or combinations thereof.

To establish a wireless connection between remote device 106 and a second device, such as device 712, communicative coupling 740 can be established between device 712 and remote device 106. Once communicative coupling 740 is established, initialization request 742 with authentication data AD712 can be sent from device 712 to remote device 106 via communicative coupling 740.

Upon reception of initialization request 742, remote device 106 can perform search of remote device data 744. In some embodiments, search of remote device data 744 includes a search for an empty remote-device-data entry to store authentication data related to device 712. As an example, suppose that remote device data included two remote-device-data entries, where one remote-device-data entry is marked as full and the remaining remote-device-data entry is marked as empty. As an example, a remote-device-data entry is initialized to a known value (e.g., a string of zeroes or spaces) considered to indicate an empty remote-device-data entry; otherwise, the remote-device-data entry can be considered to be full. Other techniques for determining a status of a remote-device-data entry are possible as well.

Then, search of remote device data 744 could find the empty remote-device data entry to store authentication data for a wireless connection between device 720 and remote device 106. When search of remote device data 744 indicates that initialization request 742 is to be accepted (e.g., the empty remote-device-data entry is found), remote device 106 can send an initialization accepted message 746 to device 712, additional communication(s) similar to additional communication(s) 728 (not shown in FIG. 7) can be exchanged between device 712 and remote device 106 as needed to establish wireless connection 748.

As with wireless connection 732, authentication data related to wireless connection 748 can include, but is not limited to, information received in initialization request 742 (e.g., part or all of AD712), data received in other communications from device 712, data generated by remote device, and/or combinations thereof.

Continuing the example regarding two remote-device-data entries described just above, a third device, such as device 714, could later establish communicative coupling 750 and then send initialization request 752 with authentication data AD714 to remote device 106 via communicative coupling 750. Upon reception of initialization request 752, remote device 106 can perform search of remote device data 754. In this example, search of remote device data 754 determines there are no empty remote-device-data entries in the remote device data to store authentication data. If search of remote device data 754 indicates that initialization request 742 is to be rejected (e.g., no empty remote-device-data entry is found), remote device 106 can send an initialization rejected message 756 to device 714.

In some embodiments, instead of rejecting an initialization request due to a lack of empty remote-device-data entries, authentication data in a full remote-device-data entry can be replaced or overwritten based on a conditional acceptance of initialization requests as illustrated in FIGS. 8A and 8B.

FIGS. 8A and 8B illustrate example scenarios related to conditional acceptance of initialization requests. In both scenario 800 of FIG. 8A and scenario 850 of FIG. 8B, a communication coupling, such as the wired communicative coupling discussed above in the context of FIG. 7, is assumed to have already been established.

FIG. 8A illustrates a scenario 800 where device 810 sends initialization request 820 with authentication data AD810 to remote device 106. Upon reception of initialization request 820, remote device 820 can perform a search of remote device data 830. During scenarios 800 and 850 (described below), search of remote device data 830 indicates that acceptance of initialization request 820 would require replacement of authentication data already stored in remote device data 214.

For example, search of remote device data 830 can determine that there are no empty remote-device-data entries in the remote device data. In particular embodiments, at least one remote-device-data entry can be replaced when there are no empty remote-device-data entries. In some of these particular embodiments, any full remote-device-data entry can later be replaced; while in other embodiments, only some, but not all, full remote-device-data entries can be replaced. In some of these particular embodiments, at least some of the data stored in the remote-device-data indicates whether one or more remote-device-data entries can be replaced and perhaps which entry or entries can be replaced.

In some embodiments, when remote device 106 determines that acceptance of an initialization request necessitates replacement of remote device data, remote device 106 generates an initialization indication for conditional acceptance of the initialization request. The initialization indication can provide information about a received initialization request, including information from the received initialization request and/or authentication data stored in the remote device data. For example, the initialization indication can include a device identifier and/or address of a device included in the received initialization request. As another example, the initialization request replacement of authentication data; in this example, the initialization indication may include information stored in remote device data about authentication data that could be subject to replacement.

FIG. 8A shows remote device 106 sending initialization indication 832 to controller device 108. Upon reception of initialization indication 832, controller device 108 generates a display based on initialization indication 832, such as a display prompting input to accept or reject an initialization request (e.g., initialization request 820). Controller device 108 can then receive the appropriate input to accept or reject the initialization request. In other embodiments not shown in FIGS. 8A and 8B, remote device 106 uses user interface 200 to generate the display based on initialization indication 832 and/or to receive the input to accept or reject initialization request 820. In still other embodiments not shown in FIGS. 8A and 8B, remote device 106 sends initialization indication 832 to a device other than controller device 108, such as (but not limited to) access node 122 or network node 124.

In scenario 800, controller device 108 receives input to accept initialization request 820. Controller device 108 responsively generates initialization indication response 834 to accept initialization request 820. In some embodiments, initialization indication response 834 also provides information related to replacement of a remote-device-data entry, such as an identifier, index, or address of a remote-device-data entry to be replaced. In other embodiment, other procedures can be used to replace remote-device-entries, such as replacement of a random full remote-device-entry, a least-recently-used full remote-device-entry, and/or an oldest (or newest) full remote-device-entry. Other replacement strategies are possible as well.

Upon reception of initialization indication response 834, remote device 106 replaces remote device data (shown as block 836 of FIG. 8A). Replacing remote device data 836 can involve selection of a portion of the remote device data to be replaced or overwritten (i.e., selecting a full remote-device-data entry for replacement). The selection of the portion of the remote device data to be replaced can be based on information received in initialization indication response 834 and/or can be determined by software and/or data resident in remote device 106. Once the portion of the remote device data is selected for replacement, authentication data related to device 810, such as authentication data described above with regards to FIG. 7, can be stored in the selected portion of remote device data.

Also upon reception of initialization indication response 834, remote device 106 can send initialization accepted 840 to device 810 in accordance with initialization indication response 834. After communicating initialization indication response 834, remote device 106 and device 810 can continue with additional communication(s), closing of the communicative coupling, and wireless connection establishment as detailed above in the context of FIG. 7.

FIG. 8B illustrates a scenario 850 with initialization request 820, search of remote device data 830, and initialization indication 832 are as described above for scenario 800 in the context of FIG. 8B. In scenario 850, unlike scenario 800, controller device 108 receives input to reject initialization request 820. Controller device 108 subsequently generates initialization indication response 864 indicating initialization request 820 has been rejected and sends initialization indication response 864 to remote device 106, which then sends initialization rejected 870 to device 810. After communication of initialization rejected 870, the communicative coupling can be closed.

In some embodiments, devices 108, 710, 712, 714, and/or 810 include "device data" and/or one or more "device-data entries" arranged using any suitable data structure or organization configured to at least enable a device to perform equivalent procedures to the herein-described procedures for remote device data on the device. That is, devices 108, 710, 712, 714, and/or 810 can include equivalent data and supporting software to perform the herein-described techniques related to remote device data and/or remote-device-data entries. In these embodiments, device data includes data required to establish, utilize, and close communicative couplings with remote device 106 (e.g., communicative couplings 740 and 750) and/or generate initialization responses (e.g., initialization accepted 726, 746, 840; initialization rejected 756, 870; and/or initialization indication 832.)

IV. Example Operation

Figure 9:
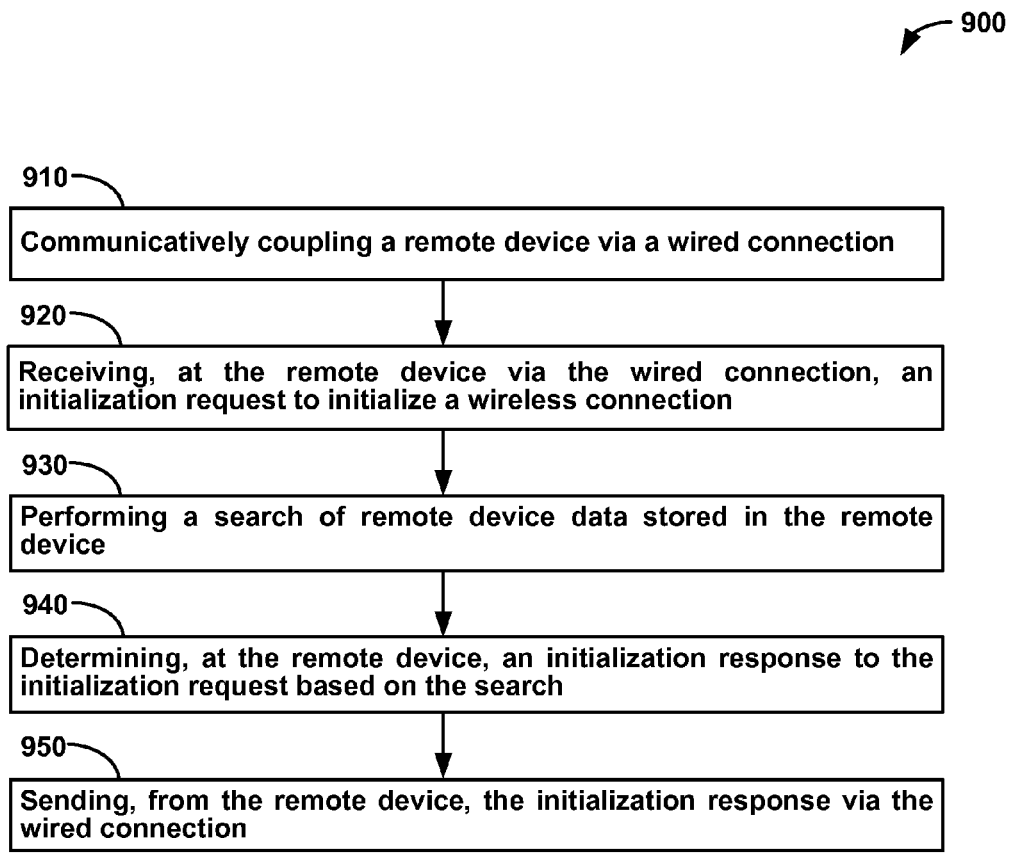
FIG. 9 is a flow chart depicting a set of functions that may be carried out in accordance with an example embodiment.

FIG. 9 depicts a flow chart that illustrates a set of functions 900 that may be carried out in accordance with an example embodiment. For example, the functions 900 can be carried out by remote device 106 described in detail above in the context of FIGS. 1-8B.

Block 910 includes communicatively coupling a remote device via a wired connection. For example, the remote device could be remote device 106 described in detail above in the context of FIGS. 1-8A. The wired connection could be a wired communicative coupling described in detail above in the context of FIGS. 7, 8A, and 8B.

Block 920 includes receiving an initialization request at the remote device via the wired connection to initialize a wireless connection. An example initialization request is a Bluetooth PDU related to initiating Bluetooth pairing, such as described in detail above in the context of FIG. 7.

Block 930 includes performing a search of remote device data stored in the remote device. Example searches of remote device data are described in detail above in the context of FIGS. 7, 8A, and 8B. In particular, searching the remote device data can include searching for an empty remote-device-data entry of the remote device data and/or searching for a full remote-device-data entry of the remote device data.

Block 940 includes determining, at the remote device, an initialization response to the initialization request based on the search.

For example, if the search finds an empty remote-device-data entry, the remote device can store authentication data in the empty remote-device-data entry and generate an initialization-acceptance response, such as described in detail above in the context of FIGS. 7 and 8A. The authentication data can be determined based on data received in the initialization request. However, if the search does not find an empty remote-device-data entry, the remote device can generate an initialization-rejection response as described in detail above in the context of FIGS. 7 and 8B.

In some embodiments, determining the initialization response includes generating an indication that the initialization request was received and sending the indication. For example, the remote device can generate and send the indication after the search determines that no empty remote-device-entries are found as discussed in detail above in the context of FIGS. 8A and 8B.

Subsequently, an indication-response to the indication can be received and the initialization response can be generated based on the indication-response. Such indications and indication responses are discussed above in detail in the context of FIGS. 8A and 8B. In particular, as discussed above in detail in the context of FIG. 8A, the remote device can select a full remote-device-data entry corresponding to the initialized wireless connection for replacement based on the indication-response, replace the authentication data in the selected full remote-device-data entry with authentication data received in the second initialization request; and generate an initialization-acceptance response. Also, as discussed above in detail in the context of FIG. 8B, the remote device can determine that the indication-response indicates the second initialization request is rejected and responsively generate an initialization-rejection response.

Block 950 includes sending the initialization response from the remote device via the wired connection. Example initialization responses include, but are not limited to, initialization-acceptance responses and initialization-rejection responses discussed in detail above in the context of FIGS. 7, 8A, and 8B, as well as block 940. In some embodiments, after sending the initialization-acceptance response, the wireless connection can be established by the remote device, perhaps after communicating additional messages or other communications.

V. Conclusion

Example embodiments of the present invention have been described above. Those skilled in the art will understand that changes and modifications may be made to the described embodiments without departing from the true scope and spirit of the present invention, which is defined by the claims.

We claim:

1. A method, comprising:
    communicatively coupling a remote device via a wired connection, wherein the remote device is operable to carry out at least one of measurement functions related to servicing a device-under-service and scanning functions related to servicing the device-under-service;
    receiving, at the remote device via the wired connection, an initialization request to initialize a wireless connection comprising authentication data for the wireless connection;
    performing a search of remote device data stored in the remote device, wherein the search comprises a search for an empty remote-device-data entry of the remote device data, and wherein the empty remote-device-data entry is configured to store authentication data, but does not store existing authentication data at a time of the search;
    determining, at the remote device, an initialization response to the initialization request and the authentication data based on the search, wherein the initialization response indicates whether the empty remote-device-data entry was found;
    sending, from the remote device, the initialization response via the wired connection;
    communicating additional authentication data for the wireless connection via the wired connection, based on the initialization response; and
    after communicating the additional authentication data for the wireless connection,
        closing the wired connection to the remote device and communicating with the remote device using the wireless connection.

2. The method of claim 1, wherein determining the initialization response comprises, in response to not finding the empty remote-device-data entry during the search, generating an initialization indication for conditional acceptance as the initialization response; and wherein the method further comprises:
    receiving, at the remote device, an initialization indication response to the initialization indication via the wired connection;
    based on the initialization indication response:
        selecting a full remote-device-data entry of the remote device data, wherein the full remote-device-data entry does store existing authentication data at the time of the search;
        replacing the existing authentication data in the selected full remote-device-data entry with the authentication data received with the initialization request; and
        generating the initialization response.

3. The method of claim 1, wherein determining the initialization response comprises:
    in response to finding the empty remote-device-data entry:
        storing the authentication data received with the initialization request in the empty remote-device-data entry, and
        generating an initialization-acceptance response.

4. The method of claim 3, wherein sending the initialization response via the wired connection comprises sending the initialization-acceptance response via the wired connection, and further comprising:
    after sending the initialization-acceptance response, establishing the wireless connection.

5. The method of claim 1, wherein determining the initialization response comprises:
    in response to not finding the empty remote-device-data entry, generating an initialization-rejection response; and
    wherein sending the initialization response comprises sending the initialization-rejection response.

6. The method of claim 1, further comprising:
    receiving a second initialization request to initialize the wireless connection; and
    determining a second initialization response to the initialization request.

7. The method of claim 1, wherein determining the initialization response to the initialization request based on the search comprises:
    generating an indication that the initialization request was received;
    sending the indication;
    receiving an indication-response to the indication; and
    generating the initialization response based on the indication-response.

8. The method of claim 7, wherein generating the initialization response based on the indication-response comprises:
    selecting a full remote-device-data entry corresponding to the initialized wireless connection for replacement based on the indication-response;

replacing the authentication data in the selected full remote-device-data entry with authentication data received in the second initialization request; and generating an initialization-acceptance response.

9. The method of claim 7, wherein generating the initialization response based on the indication-response comprises:

determining that the indication-response indicates the second initialization request is rejected; and responsively generating an initialization-rejection response.

10. A device, comprising:

a wired-connection interface;

memory;

a processor; and instructions, stored in the memory, that responsive to execution by the processor, cause the device to perform functions comprising:

communicatively coupling to a wired connection via the wired-connection interface to carry out at least one of measurement functions for servicing a device-under-service and scanning functions for servicing the device-under service, receiving, via the wired connection, an initialization request to initialize a wireless connection comprising authentication data for the wireless connection, performing a search of device data stored in the memory, wherein the search comprises a search for an empty remote-device-data entry of the device data, and wherein the empty remote-device-data entry is configured to store authentication data, but does not store existing authentication data at a time of the search, determining an initialization response to the initialization request and the authentication data based on the search, wherein the initialization response indicates whether the empty remote-device-data entry was found, sending the initialization response via the wired connection, communicating additional authentication data for the wireless connection via the wired connection, based on the initialization response, and after communicating the additional authentication data for the wireless connection, closing the wired connection and communicating using the wireless connection.

11. The device of claim 10, wherein determining the initialization response comprises, in response to not finding the empty device-data entry during the search, generating an initialization indication for conditional acceptance as the initialization response; and wherein the method further comprises:

receiving, at the device, an initialization indication response to the initialization indication via the wired connection;

based on the initialization indication response:

selecting a full device-data entry of the device data, wherein the full device-data entry does store existing authentication data at the time of the search;

replacing the existing authentication data in the selected full device-data entry with the authentication data received with the initialization request; and generating the initialization response.

12. The device of claim 10, wherein determining the initialization response comprises:

in response to finding the empty device-data entry in the device data:

storing the authentication data received with the initialization request in the empty device-data entry, and generating an initialization-acceptance response.

13. The device of claim 10, wherein determining the initialization response comprises in response to not finding the empty device-data entry, generating an initialization-rejection response; and wherein sending the initialization response via the wired connection comprises sending the initialization-rejection response via the wired connection.

14. The device of claim 10, the functions further comprising:

receiving a second initialization request to initialize the wireless connection; and determining a second initialization response to the initialization request.

15. The device of claim 10, determining the initialization response to the initialization request based on the search comprises:

generating an indication that the initialization request was received;

sending the indication;

receiving an indication-response to the indication; and generating the initialization response based on the indication-response.

16. The device of claim 15, wherein generating the second initialization response comprises:

selecting a full device-data entry corresponding to the initialized wireless connection for replacement based on the indication-response;

replacing authentication data in the selected full device data entry with authentication data received in the second initialization request; and generating an initialization-acceptance response.

17. The device of claim 16, wherein generating the second initialization response comprises:

determining that the indication-response indicates the second initialization request is rejected; and responsively generating an initialization-rejection response.

18. A computer-readable storage medium having instructions stored thereon that, responsive to execution by a processor of a device, cause the device to perform functions comprising:

communicatively coupling via a wired connection to carry out at least one of measurement functions related to servicing a device-under-service and scanning functions related to servicing the device-under-service;

receiving, via the wired connection, an initialization request to initialize a wireless connection comprising authentication data for the wireless connection;

performing a search of stored device data, wherein the search comprises a search for an empty remote-device-data entry of the stored device data, and wherein the empty remote-device-data entry is configured to store authentication data, but does not store existing authentication data at a time of the search;

determining an initialization response to the initialization request and the authentication data based on the search, wherein the initialization response indicates whether the empty remote-device-data entry was found;

sending the initialization response via the wired connection;

communicating additional authentication data for the wireless connection via the wired connection, based on the initialization response; and after communicating the additional authentication data for the wireless connection,
closing the wired connection to the device and communicating with the device using the wireless connection.

19. The method of claim 1, wherein the wired connection comprises a wired connection between the remote device and a first device that differs from the remote device;
wherein the wireless connection comprises a wireless connection between the remote device and the first device.

20. The method of claim 19, wherein communicating additional authentication data for the wireless connection via the wired connection comprises establishing the wireless connection between the remote device and the first device using the wired connection; and
wherein closing the wired connection to the remote device comprises closing the wired connection between the remote device and the first device.

\* \* \* \* \*